United States Patent
Chung et al.

(10) Patent No.: US 12,402,147 B2
(45) Date of Patent: Aug. 26, 2025

(54) METHOD AND DEVICE FOR TRANSMITTING/RECEIVING SIGNAL ON BASIS OF SPATIAL PARAMETERS IN WIRELESS COMMUNICATION SYSTEM

(71) Applicant: LG ELECTRONICS INC., Seoul (KR)

(72) Inventors: Jaehoon Chung, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 17/796,627

(22) PCT Filed: Mar. 16, 2021

(86) PCT No.: PCT/KR2021/003233
§ 371 (c)(1),
(2) Date: Jul. 29, 2022

(87) PCT Pub. No.: WO2021/187862
PCT Pub. Date: Sep. 23, 2021

(65) Prior Publication Data
US 2023/0069777 A1    Mar. 2, 2023

(30) Foreign Application Priority Data
Mar. 16, 2020    (KR) .................. 10-2020-0031940

(51) Int. Cl.
H04W 4/00    (2018.01)
H04L 1/1812    (2023.01)
(Continued)

(52) U.S. Cl.
CPC ........... *H04W 16/28* (2013.01); *H04L 1/1812* (2013.01); *H04W 72/1273* (2013.01); *H04W 72/23* (2023.01)

(58) Field of Classification Search
USPC ................................................ 370/329, 330
See application file for complete search history.

(56) References Cited

U.S. PATENT DOCUMENTS 11,457,462 B2 *   9/2022   Khoshnevisan ...... H04L 5/0053
11,563,537 B2 *   1/2023   John Wilson ......... H04L 1/1685
(Continued)

OTHER PUBLICATIONS

ZTE, "Details of latency and overhead reduction for beam management", R1-1906245, 3GPP TSG RAN WG 1 #97, Reno, USA. May 13-17, 2019, see sections 2.1.3 and 2.2.1; and figure 1.
(Continued)

*Primary Examiner* — Chuong T Ho
(74) *Attorney, Agent, or Firm* — BRYAN CAVE LEIGHTON PAISNER LLP

(57) ABSTRACT

A method and an apparatus for transmitting and receiving a signal based on a spatial parameter in a wireless communication system are disclosed. A method of performing downlink reception or uplink transmission by a user equipment (UE) in a wireless communication system according to an embodiment of the present disclosure may comprise: receiving first downlink control information (DCI) including information on a spatial parameter; and performing the downlink reception or the uplink transmission, based on the spatial parameter included in the first DCI, and based on that the downlink reception is second DCI, a spatial parameter corresponding to the spatial parameter included in the first DCI may be applied for at least one specific control resource set (CORESET) among at least one CORESET configured for the UE.

11 Claims, 17 Drawing Sheets

(51) Int. Cl.
*H04W 16/28* (2009.01)
*H04W 72/1273* (2023.01)
*H04W 72/23* (2023.01)

(56) References Cited

U.S. PATENT DOCUMENTS

| | | | |
|---|---|---|---|
| 2018/0343653 A1* | 11/2018 | Guo | H04B 7/088 |
| 2019/0280757 A1* | 9/2019 | Yang | H04L 5/0048 |
| 2019/0297640 A1* | 9/2019 | Liou | H04L 5/001 |
| 2019/0342907 A1 | 11/2019 | Huang et al. | |
| 2020/0077395 A1* | 3/2020 | Guo | H04W 4/70 |
| 2020/0314664 A1* | 10/2020 | Zhou | H04L 5/0023 |
| 2021/0051635 A1* | 2/2021 | Lo | H04W 72/23 |
| 2021/0258967 A1* | 8/2021 | Zhang | H04W 72/53 |
| 2021/0259004 A1* | 8/2021 | Takeda | H04L 1/08 |
| 2022/0116177 A1* | 4/2022 | Shi | H04L 5/0053 |
| 2022/0205187 A1* | 6/2022 | Fukumoto | E01C 9/086 |
| 2022/0264537 A1* | 8/2022 | Shi | H04L 5/001 |
| 2022/0312456 A1* | 9/2022 | Guo | H04L 1/1822 |
| 2023/0007681 A1* | 1/2023 | Yuan | H04L 1/1822 |
| 2023/0224726 A1* | 7/2023 | Kim | H04B 7/024 |
| | | | 370/329 |

OTHER PUBLICATIONS

NTT Docomo, Inc., "Discussion on multi-beam enhancement", R1-1911185, 3GPP TSG RAN WG1 #98 bis, Chongqing, China. Oct. 14-20, 2019, see pp. 1 and 8.
LG Electronics, "Outcome of email thread [100e-NR-eMIMO-MB-03]", R1-2001261, 3GPP TSG RAN WG1 #100, e-Meeting, Feb. 24-Mar. 6, 2020, see sections 2.2 and 4.

* cited by examiner

METHOD AND DEVICE FOR TRANSMITTING/RECEIVING SIGNAL ON BASIS OF SPATIAL PARAMETERS IN WIRELESS COMMUNICATION SYSTEM

CROSS-REFERENCE TO RELATED APPLICATIONS

This application is the National Stage filing under 35 U.S.C. 371 of International Application No. PCT/KR2021/003233, filed on Mar. 16, 2021, which claims the benefit of and priority to Korean Application No. 10-2020-0031940, filed on Mar. 16, 2020, the contents of which are all hereby incorporated by reference herein in their entirety.

TECHNICAL FIELD

The present disclosure relates to a wireless communication system, and more particularly, to a method and apparatus for transmitting and receiving a signal based on a spatial parameter in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for transmitting and receiving a signal based on a spatial parameter.

An additional technical object of the present disclosure is to provide a method and apparatus for transmitting and receiving downlink control information based on a spatial parameter applied to downlink data transmission.

An additional technical object of the present disclosure is to provide a method and apparatus for transmitting and receiving an uplink signal based on a spatial parameter applied to downlink data transmission.

The technical objects to be achieved by the present disclosure are not limited to the above-described technical objects, and other technical objects which are not described herein will be clearly understood by those skilled in the pertinent art from the following description.

Technical Solution

A method of performing downlink reception or uplink transmission by a user equipment (UE) in a wireless communication system according to an aspect of the present disclosure may comprise: receiving first downlink control information (DCI) including information on a spatial parameter; and performing the downlink reception or the uplink transmission, based on the spatial parameter included in the first DCI, and based on that the downlink reception is second DCI, a spatial parameter corresponding to the spatial parameter included in the first DCI may be applied for at least one specific control resource set (CORESET) among at least one CORESET configured for the UE.

A method of performing downlink transmission or uplink reception by a base station (BS) in a wireless communication system according to an additional aspect of the present disclosure may comprise: transmitting, to a user equipment (UE), first downlink control information (DCI) including information on a spatial parameter; and performing the downlink transmission or the uplink reception, based on the spatial parameter included in the first DCI, and based on that the downlink reception is second DCI, a spatial parameter corresponding to the spatial parameter included in the first DCI may be applied for at least one specific control resource set (CORESET) among at least one CORESET configured for the UE.

Technical Effects

According to the present disclosure, a method and an apparatus for transmitting and receiving a signal based on a spatial parameter may be provided.

According to the present disclosure, a method and an apparatus for transmitting and receiving downlink control information based on a spatial parameter applied to downlink data transmission may be provided.

According to the present disclosure, a method and an apparatus for transmitting and receiving an uplink signal based on a spatial parameter applied to downlink data transmission may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
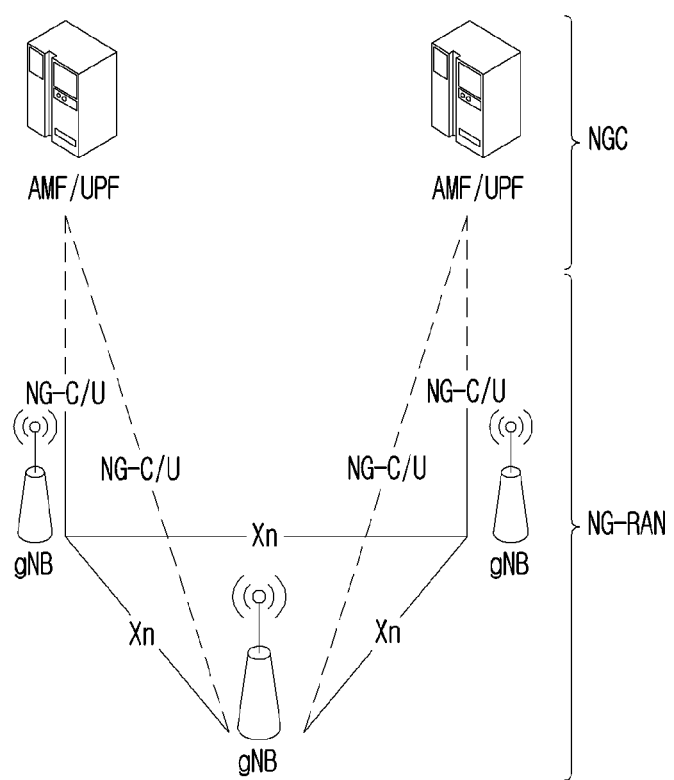
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
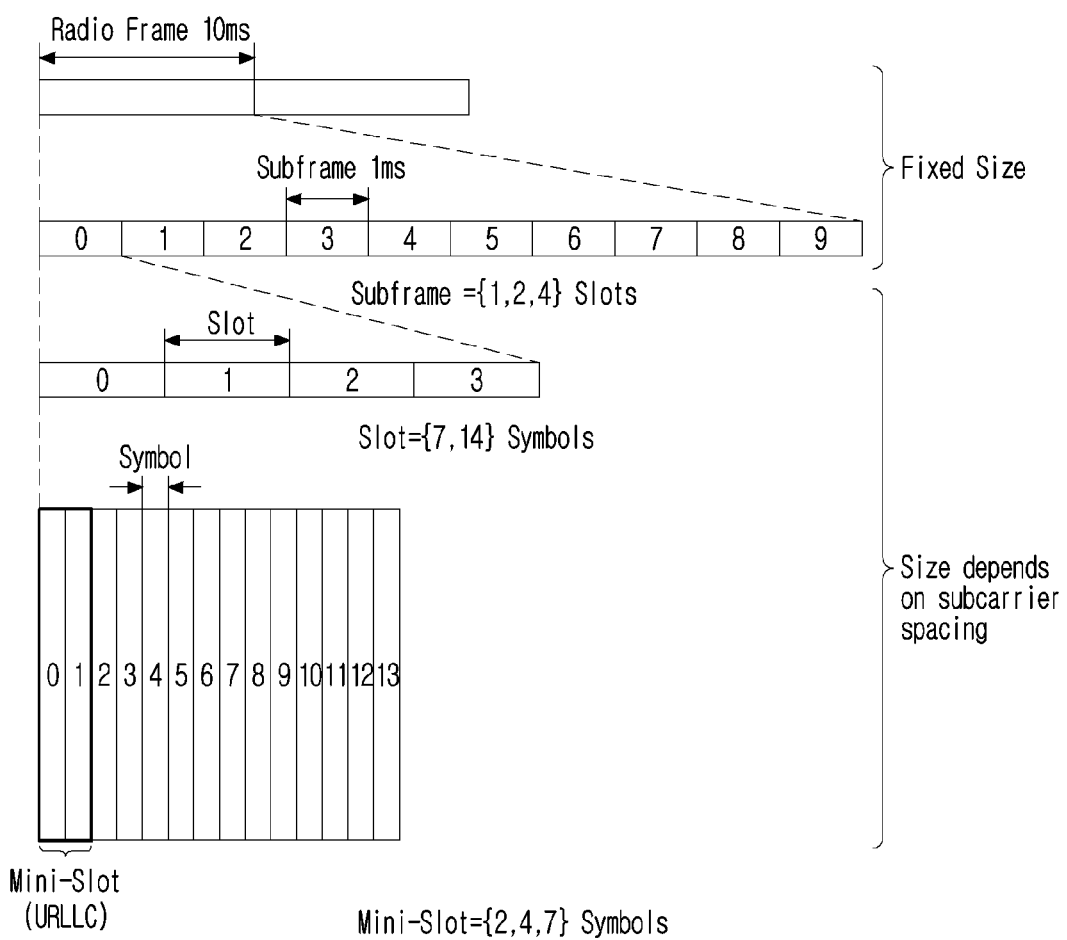
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu} - 1\}$ in a subframe and are numbered in an increasing order of $n_s^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 41

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
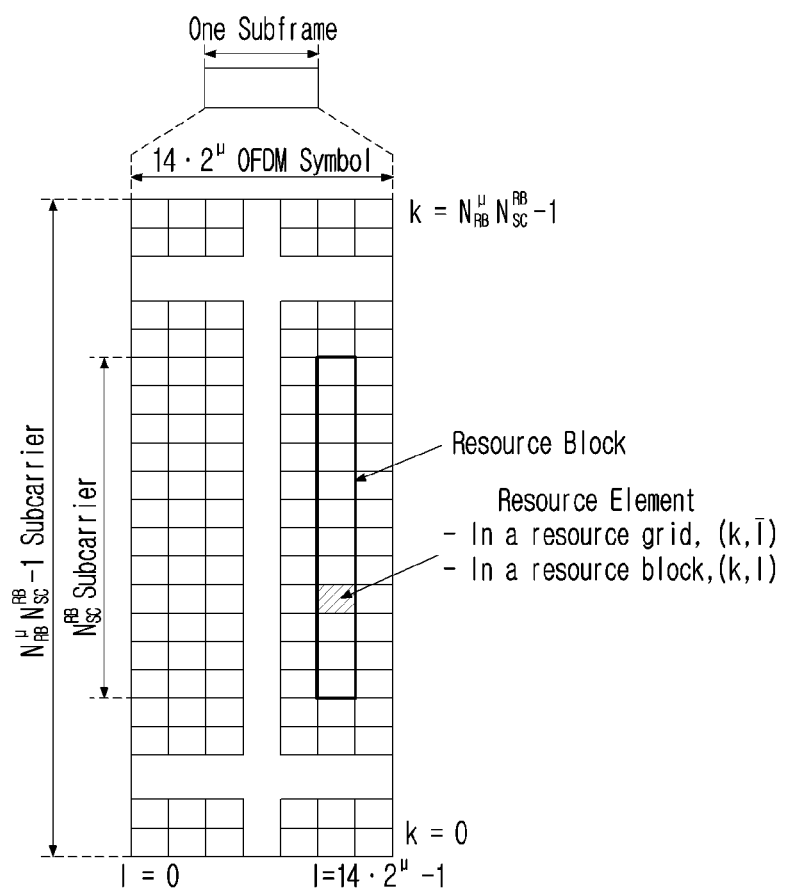
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for p and an antenna port p is referred to as a resource element and is uniquely identified by an index pair (k,l'). Here, $k=0, \ldots, N_{RB}^\mu N_{sc}^{RB} - 1$ is an index in a frequency domain and $l'=0, \ldots, 2^\mu N_{symb}^{(\mu)} - 1$ refers to a position of a symbol in a subframe. When referring to a resource element in a slot, an index pair (k,l) is used. Here, $l = 0, \ldots, N_{symb}^\mu - 1$. A resource element (k,l') for μ and an antenna port p corresponds to a complex value, $a_{k,l'}^{(p,\mu)}$.

When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
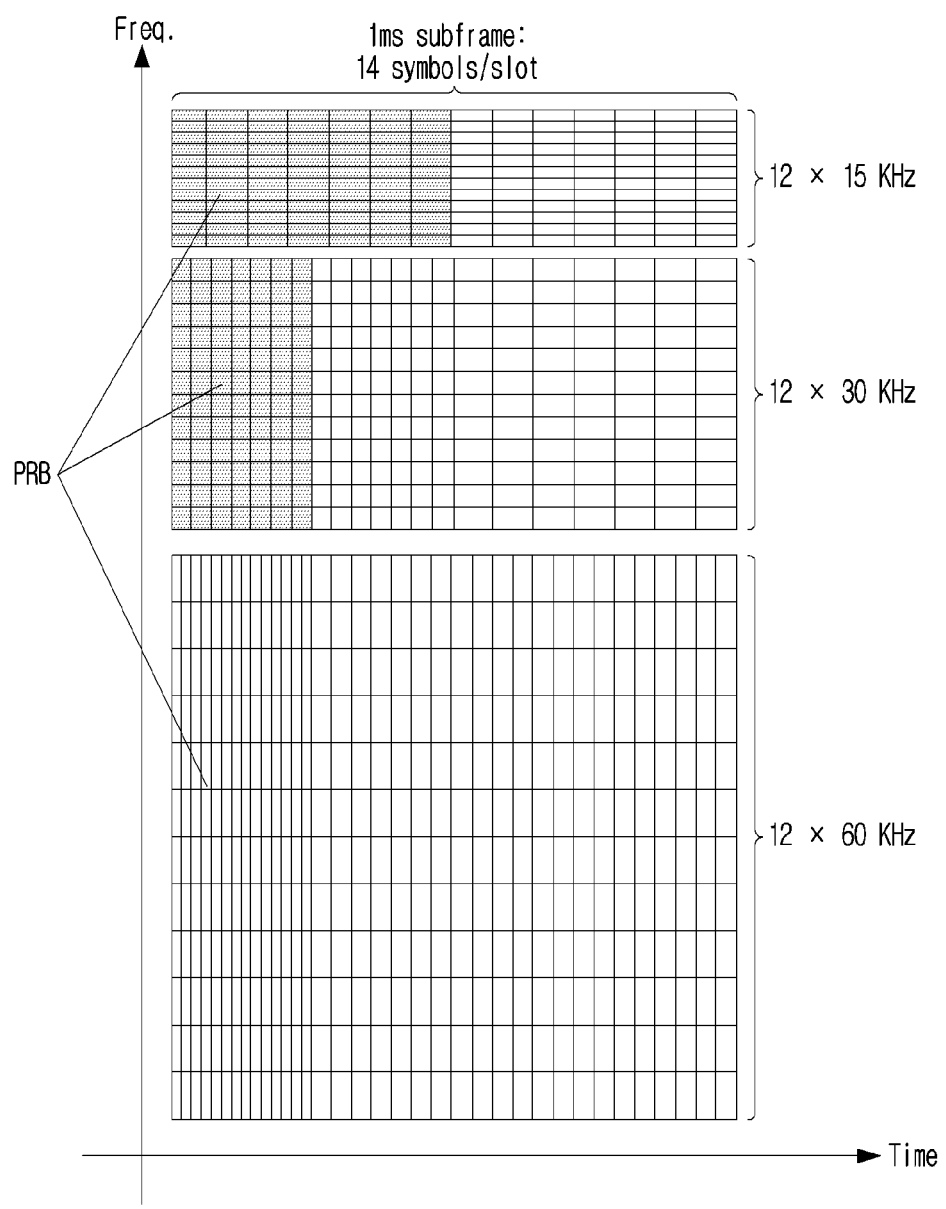
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
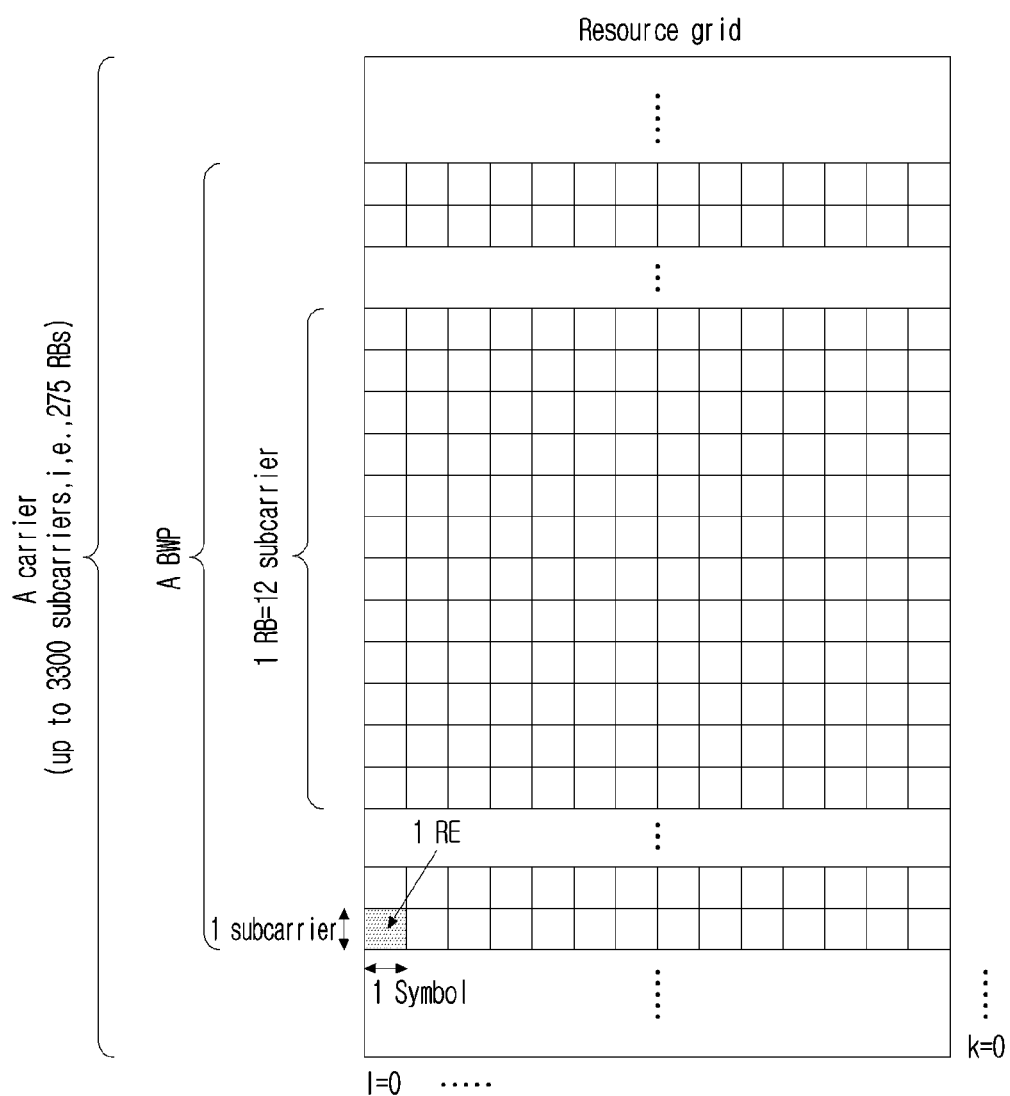
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
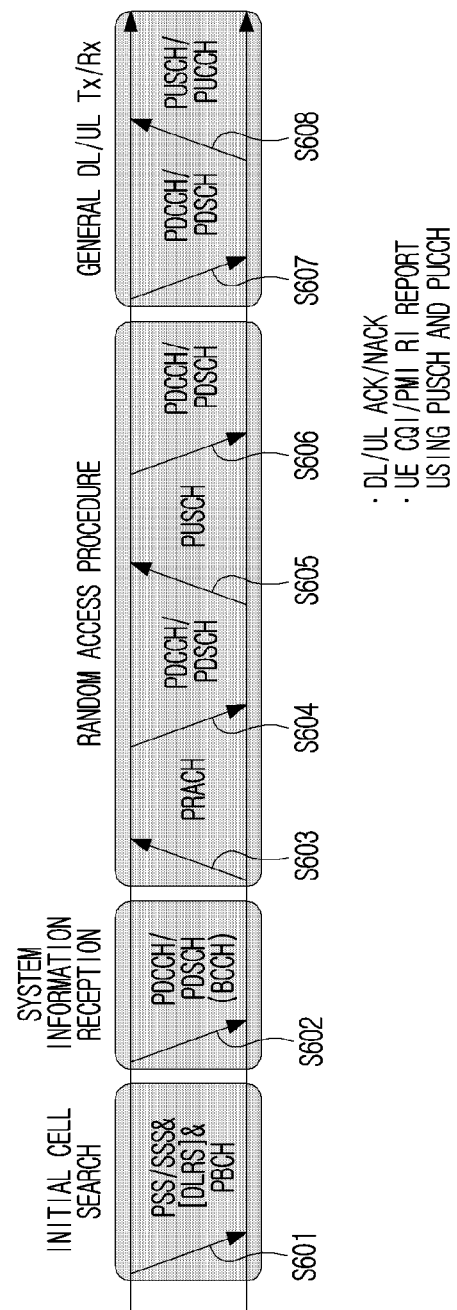
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
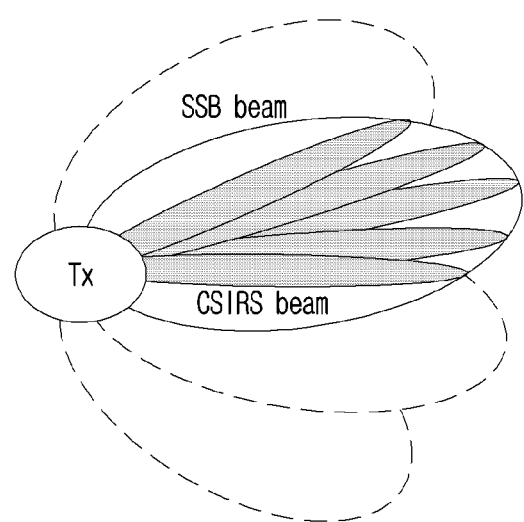
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
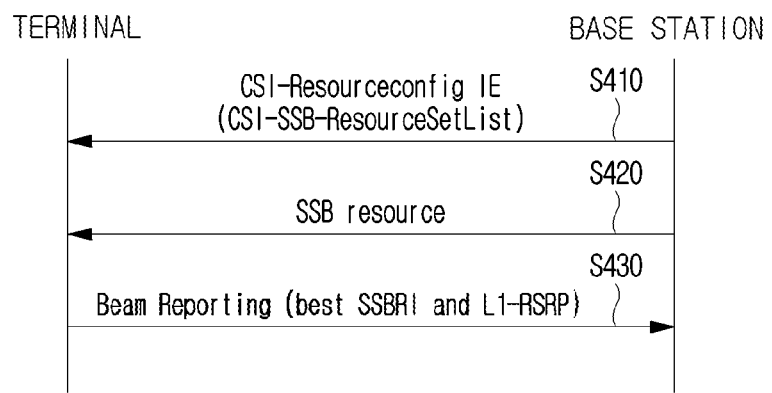
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

TABLE 6

| |  |
|---|---|
| ASN1START | |
| TAG-CSI-RESOURCECONFIG-START | |
| CSI-ResourceConfig ::= | SEQUENCE { |
| csi-ResourceConfigId | CSI-ResourceConfigId, |
| csi-RS-ResourceSetList | CHOICE { |
| nzp-CSI-RS-SSB | SEQUENCE { |
| nzp-CSI-RS-ResourceSetList | SEQUENCE (SIZE |
| (1..maxNrofNZP-CSI-RS-ResourceSetsPerConfig)) OF NZP-CSI-RS-ResourceSetId OPTIONAL, | |
| csi-SSB-ResourceSetList | SEQUENCE (SIZE |
| (1..maxNrofCSI-SSB-ResourceSetsPerConfig)) OF CSI-SSB-ResourceSetId OPTIONAL | |
| }, | |
| csi-IM-ResourceSetList | SEQUENCE (SIZE |
| (1..maxNrofCSI-IM-ResourceSetsPerConfig)) OF CSI-IM-ResourceSetId | |
| }, | |
| bwp-Id | BWP-Id, |
| resourceType | ENUMERATED { aperiodic, semiPersistent, periodic }, |
| ... | |
| } | |
| TAG-CSI-RESOURCECONFIGTOADDMOD-STOP | |
| -- ASN1STOP | |

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
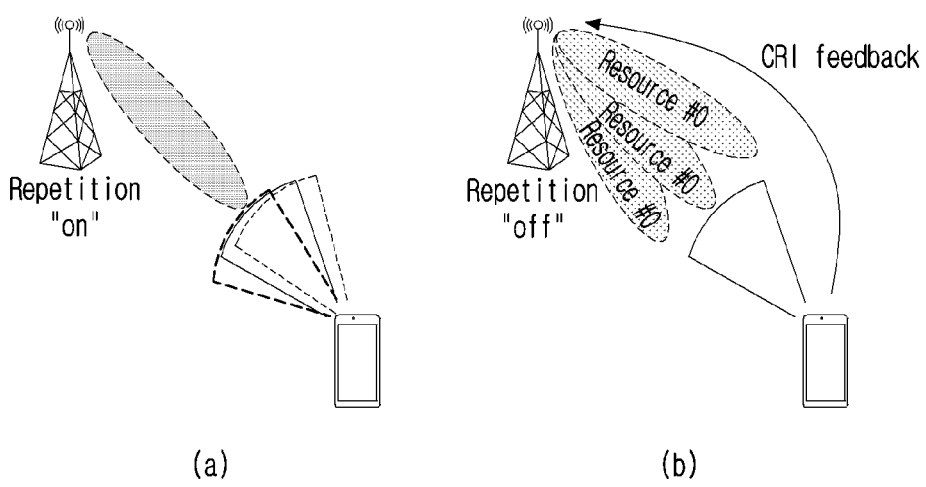
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
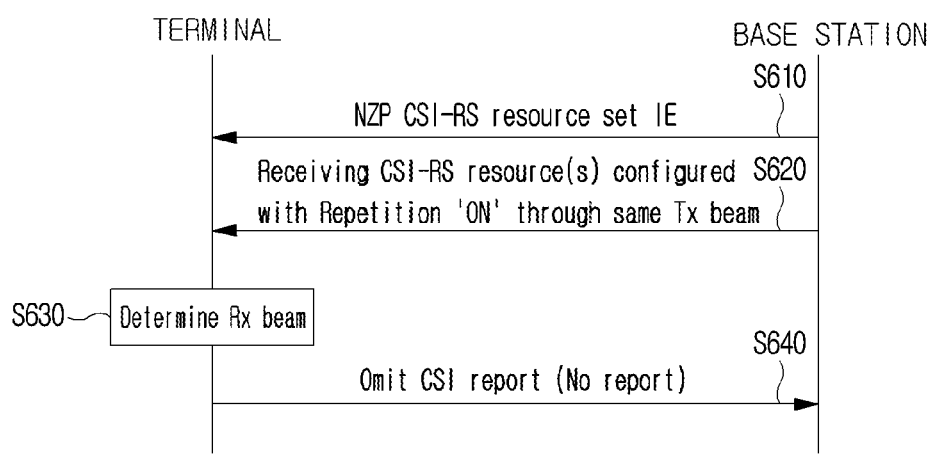
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
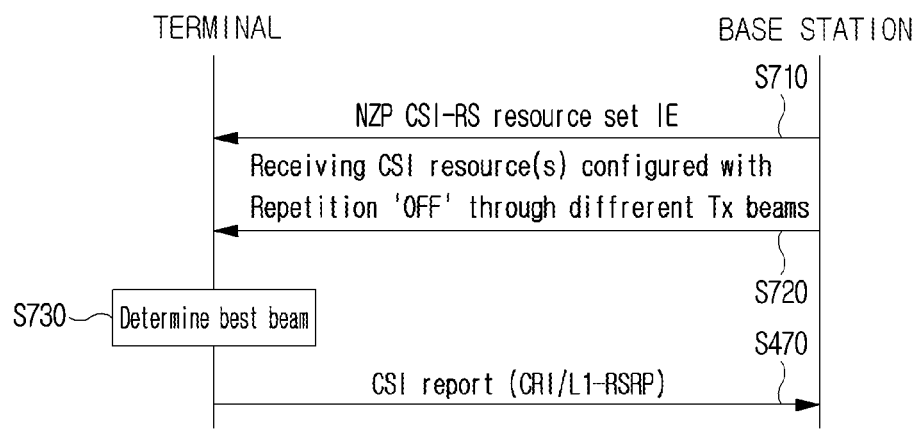
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
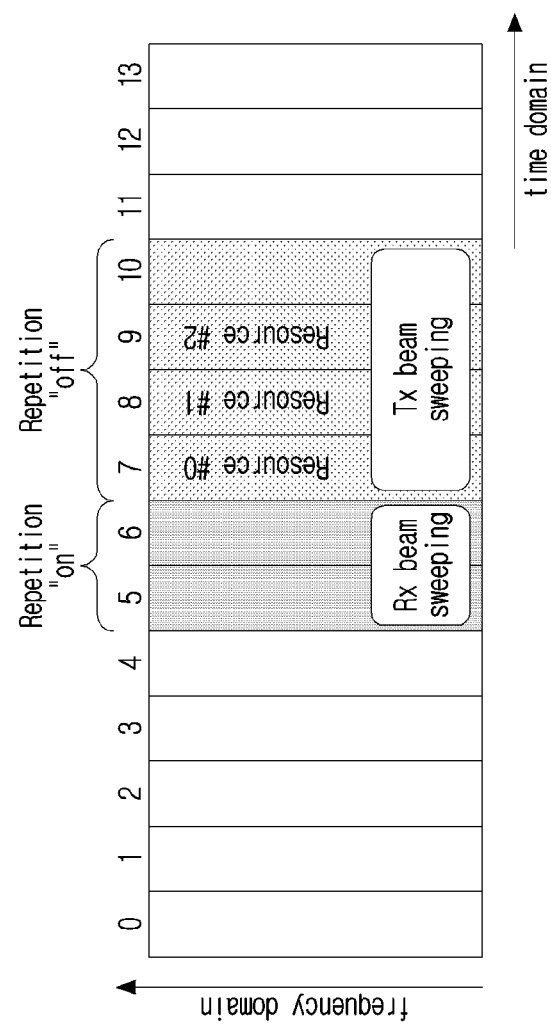
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
ASN1START
TAG-TCI-STATE-START
TCI-State ::=           SEQUENCE {
tci-StateId             TCI-StateId,
qcl-Type1               QCL-Info,
qcl-Type2               QCL-Info
                        OPTIONAL, -- Need R
...
}
QCL-Info ::=            SEQUENCE {
cell                    ServCellIndex
                        OPTIONAL, -- Need R
bwp-Id                  BWP-Id
                        OPTIONAL, -- Cond CSI-RS-Indicated
referenceSignal         CHOICE {
csi-rs                  NZP-CSI-RS-ResourceId,
ssb                     SSB-Index
},
qcl-Type                ENUMERATED {typeA, typeB, typeC,
typeD},
...
}
TAG-TCI-STATE-STOP
-- ASN1STOP
```

In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
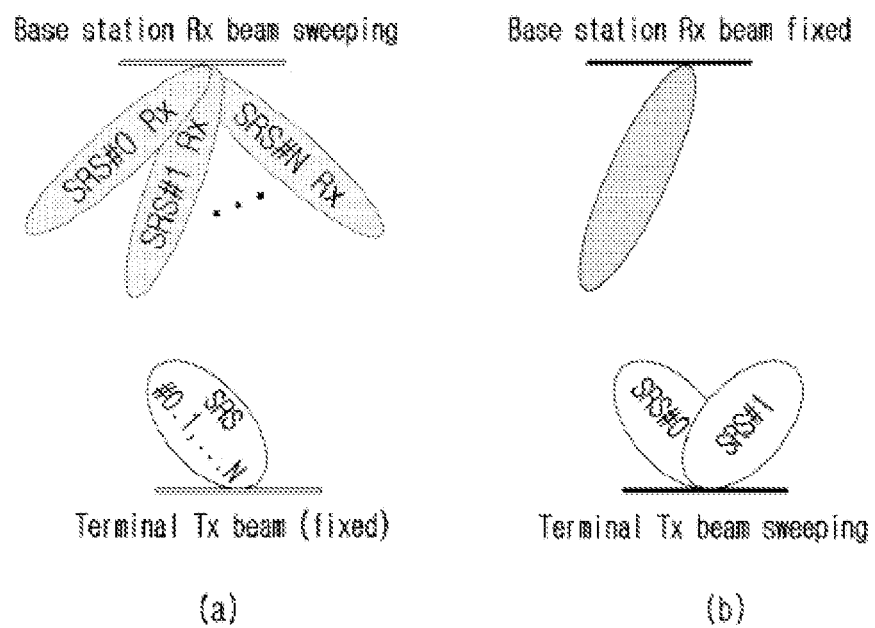
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
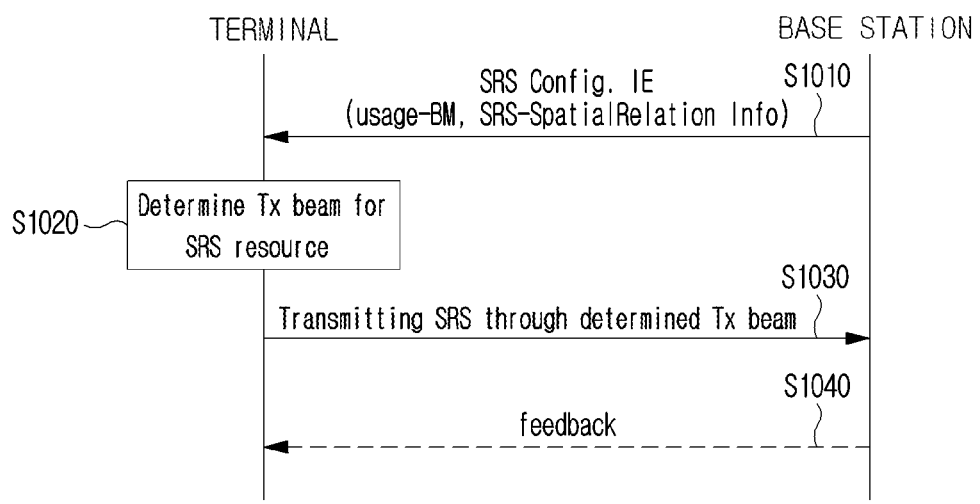
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config ::=                        SEQUENCE {
srs-ResourceSetToReleaseList          SEQUENCE
(SIZE(1..maxNrofSRS-ResourceSets)) OF SRS-ResourceSetId
   OPTIONAL, -- Need N
srs-ResourceSetToAddModList           SEQUENCE
(SIZE(1..maxNrofSRS-ResourceSets)) OF SRS-ResourceSet
   OPTIONAL, -- Need N
srs-ResourceToReleaseList             SEQUENCE
(SIZE(1..maxNrofSRS-Resources)) OF SRS-ResourceId
   OPTIONAL, -- Need N
srs-ResourceToAddModList              SEQUENCE
(SIZE(1..maxNrofSRS-Resources)) OF SRS-Resource
   OPTIONAL, -- Need N
tpc-Accumulation                      ENUMERATED
                                      {disabled}
                                      OPTIONAL, -- Need S
...
}
SRS-ResourceSet ::=                   SEQUENCE {
srs-ResourceSetId                     SRS-ResourceSetId,
srs-ResourceIdList                    SEQUENCE
```

TABLE 8-continued

```
(SIZE(1..maxNrofSRS-ResourcesPerSet)) OF SRS-ResourceId
   OPTIONAL, -- Cond Setup
resourceType                          CHOICE {
aperiodic                             SEQUENCE {
aperiodicSRS-ResourceTrigger          INTEGER
                                      (1..maxNrofSRS-
TriggerStates-1),
csi-RS                                NZP-CSI-RS-ResourceId
                                      OPTIONAL, -- Cond NonCodebook
slotOffset                            INTEGER (1..32)
                                      OPTIONAL, -- Need S
...
},
semi-persistent                       SEQUENCE {
associatedCSI-RS                      NZP-CSI-RS-ResourceId
                                      OPTIONAL, -- Cond
                                      NonCodebook
...
},
periodic                              SEQUENCE {
associatedCSI-RS                      NZP-CSI-RS-ResourceId
                                      OPTIONAL, -- Cond
                                      NonCodebook
...
}
},
usage                                 ENUMERATED
                                      (beamManagement,
codebook, nonCodebook, antennaSwitching},
alpha                                 Alpha
                                      OPTIONAL, -- Need S
p0                                    INTEGER (-202..24)
                                      OPTIONAL, -- Cond Setup
pathlossReferenceRS                   CHOICE {
ssb-Index                             SSB-Index,
csi-RS-Index                          NZP-CSI-RS-ResourceId
SRS-SpatialRelationInfo ::=           SEQUENCE {
servingCellId                         ServCellIndex
   OPTIONAL, -- Need S
referenceSignal                       CHOICE {
ssb-Index                             SSB-Index,
csi-RS-Index                          NZP-CSI-RS-ResourceId,
srs                                   SEQUENCE {
resourceId                            SRS-ResourceId,
uplinkBWP                             BWP-Id
}
}
}
SRS-ResourceId ::=                    INTEGER
(0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfig-Type' is configured as 'periodic':
  i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
  ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or
  iii) when SRS-SpatialRelationInfo is configured as ' SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).
  i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
  ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
  iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.
  i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.
  ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.
  iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent. A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement
NZP CSI-RS resource for interference measurement
NZP CSI-RS resource for channel measurement In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.
 i) Periodic CSI reporting is performed in a short PUCCH, a long PUCCH. Periodicity and a slot offset of periodic CSI reporting may be configured by RRC and refers to a CSI-ReportConfig IE.
 ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI(format 0_1). For SP CSI reporting in a PUSCH, a separated RNTI(SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.
 iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Transmission and Reception of Control Information Based on a Spatial Parameter

Hereinafter, various examples of the present disclosure for transmitting and receiving control information based on a spatial parameter will be described.

A spatial parameter (or a parameter related to beam transmission/reception) related to transmission/reception of control information may include QCL information applied to a physical channel through which control information is transmitted and received or assumed by the terminal. The QCL information may include QCL reference signal (RS) information, and the QCL RS information may be configured for each QCL type (e.g., QCL type A/B/C/D). For example, downlink control information (DCI) may be transmitted and received through PDCCH, and a spatial parameter related to DCI transmission/reception may include QCL reference information for PDCCH DMRS antenna port(s), TCI state information, etc.

However, in the present disclosure, the term spatial parameter is not limited to QCL information and may include a spatial parameter applied to uplink transmission (e.g., spatial relation info related to an uplink transmission beam). For example, uplink control information (UCI) may be transmitted/received through PUCCH and/or PUSCH, and a spatial parameter related to UCI transmission/reception may include PRI (resource indicator) and spatial relation info, etc. related to PUCCH/PUSCH transmission/reception.

In addition, a spatial parameter may be separately set for downlink or uplink, or may be configured integrally for downlink and uplink.

In addition, a spatial parameter may also be defined or configured as a spatial parameter set including at least one spatial parameter. Hereinafter, in order to simplify the description, at least one spatial parameter is collectively referred to as a spatial parameter.

In the following examples, a method for efficiently determining a spatial parameter to be applied to transmission/reception of downlink control information and/or uplink control information will be described.

In order for the base station to configure/indicate the PDCCH reception spatial parameter (or reception beam) of the terminal, it may configure/update the TCI state ID for each of one or more CORESETs. The TCI state configured for CORESET may indicate QCL reference information (e.g., QCL type D related information) for PDCCH DMRS antenna port(s) transmitted through the corresponding CORESET. That is, QCL reference information (e.g., QCL Type D information) of the TCI state ID configured/updated for each CORESET may correspond to the PDCCH reception beam of the terminal.

In the case of a spatial parameter (or reception beam) configuration/indication for PDSCH reception, a TCI field may be included in the PDCCH DCI for scheduling the corresponding PDSCH. The TCI status ID (or TCI codepoint) indicated by the TCI field in DCI may indicate QCL reference information (e.g., QCL type D related information) for the PDSCH DMRS antenna port(s).

Configuration/indication of a spatial parameter for PDSCH reception may be dynamically performed through DCI. Since a spatial parameter for PDCCH reception is based on CORESET configuration, RRC reconfiguration or MAC CE message transmission for CORESET configuration/update is required to configure/indicate the spatial parameter for PDCCH reception. Accordingly, since it is difficult to dynamically configure/update the spatial parameter for PDCCH reception, there are problems in that flexibility is low and signaling overhead for CORESET configuration/update is high.

In order to solve such a problem, in the following examples, methods for minimizing signaling overhead and dynamically configuring/indicating or changing/updating a beam for receiving/transmitting downlink control information and/or uplink control information will be described.

Hereinafter, a spatial parameter configuration scheme for CORESET/search space (SS)/PDCCH through RRC/MAC CE signaling is referred to as a semi-static scheme or a higher layer (e.g., L2/L3) based scheme. As a scheme distinct from this, a spatial parameter configuration scheme for CORESET/SS/PDCCH based on the spatial parameter for PDSCH reception in examples of the present disclosure is referred to as a dynamic scheme or a lower layer (e.g., L1) based scheme.

In the following examples, the meaning of using/applying/mapping a specific spatial parameter (or TCI state or TCI) when transmitting/receiving data/DCI/UCI for a certain frequency/time/spatial resource is that in the case of DL estimating a channel from DMRS using the QCL type and QCL RS indicated by the corresponding spatial parameter in corresponding frequency/time/spatial resources and receiving/demodulating data/DCI (e.g., PDSCH/PDCCH) with the estimated channel and in the case of UL transmitting/modulating DMRS and data/UCI (e.g., PUSCH/PUCCH) using transmission beam and/or transmission power indicated by the corresponding spatial parameter in corresponding frequency/time/spatial resources.

Figure 15:
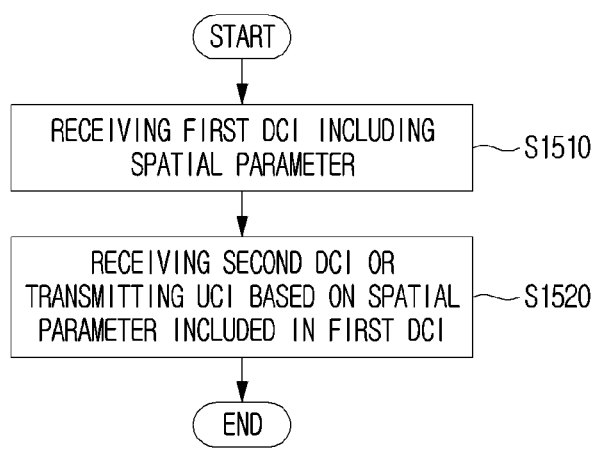
FIG. 15 is a flowchart illustrating a method of transmitting and receiving control information based on spatial parameters of a terminal according to the present disclosure.

FIG. 15 is a flowchart illustrating a method of transmitting and receiving control information based on spatial parameters of a user equipment according to the present disclosure.

In step S1510, the terminal may receive the first DCI including a spatial parameter. For example, the first DCI may be received through the first PDCCH. Also, the first DCI may include scheduling information for a downlink data channel (e.g., PDSCH). For example, the spatial parameter (or spatial parameter indication field) included in the first DCI may include information indicating TCI status/QCL information applied to the downlink data channel.

In addition, the spatial parameter (or spatial parameter indication field) included in the first DCI may include at least one of a spatial parameter (e.g., TCI state/QCL information) applied to a second DCI (or second PDCCH) to be described below or a spatial parameter (e.g., spatial parameter information/QCL information) applied to UCI (or PUSCH and/or PUCCH), or may be applied for this.

Although not illustrated in FIG. 15, the terminal may receive a PDSCH scheduled by the first DCI. For example, the terminal may estimate a channel from a PDSCH DMRS scheduled by the first DCI (or associated with the first DCI)

based on a spatial parameter included in the first DCI. In addition, the terminal may perform PDSCH demodulation/decoding/reception based on the channel estimated from the DMRS.

In step S1520, the terminal may receive the second DCI or transmit the UCI based on the spatial parameter included in the first DCI. For example, the terminal may receive the second PDCCH including the second DCI based on the spatial parameter included in the first DCI. Also, the terminal may transmit a PUSCH and/or PUCCH including UCI based on the spatial parameter included in the first DCI.

Here, the terminal may configure/update a spatial parameter for CORESET (or CORESET pool) in which the first DCI is monitored or for reception of the second DCI (or second PDCCH) received in entire CORESET (or CORESET(s) other than the specific CORESET) set to the terminal, based on the spatial parameter included in the first DCI.

The specific CORESET may correspond to CORESET 0, and CORESET 0 may be configured by a master information block (MIB) provided through a PBCH. The MIB may be obtained by the terminal from the network in the initial access phase, and in CORESET 0 configured by the MIB, the terminal may monitor the PDCCH including information for scheduling the system information block 1 (SIB1). After the terminal is connected, one or more CORESETs may be further configured through RRC signaling. An identifier may be assigned to each of a plurality of CORESETs.

In addition, with respect to the terminal, based on the spatial parameter of the first DCI, whether to enable/activation of configuring/updating a spatial parameter for the corresponding CORESET/CORESET pool/entire CORESET may be configured.

In addition, when a plurality of spatial parameters are included in the first DCI (or a plurality of spatial parameters are indicated by a specific field of the first DCI), the terminal may configure/update a spatial parameter for the corresponding CORESET/CORESET pool/entire CORESET, based on a specific spatial parameter among the plurality of spatial parameters.

The second DCI (or the second PDCCH) may be received after a predetermined time unit from the transmission timing of response information for the PDSCH scheduled by the first DCI or for the first DCI (or the first PDCCH). That is, the spatial parameter included in the first DCI may not be applied for the DCI/PDCCH received before (or before) the predetermined time unit. Here, the response information may include at least one of HARQ-ACK/NACK for downlink reception, SRS, and PRACH.

In addition, the time unit may be configured as a symbol, a symbol group, a slot, a slot group, a sub-slot, a subframe, or an absolute time unit (e.g., msec). In addition, the time unit may be fixed or may be configured by the base station.

The terminal may determine a spatial parameter (e.g., spatial related information, QCL information, etc.) to be applied to transmission of a PUCCH and/or PUSCH including UCI based on the spatial parameter included in the first DCI. In addition, whether the spatial parameter to be applied to UCI transmission is based on either a PRI (PUCCH resource indicator) or the spatial parameter included in the first DCI may be preconfigured to the terminal. If the terminal transmits a PUSCH through a preconfigured resource without a UL grant (or UL scheduling information) (e.g., in the case of a configured grant scheme PUSCH transmission), the first DCI may correspond to the most recently (or last) received PDSCH scheduling DCI before the corresponding PUSCH transmission.

Embodiment 1

This embodiment relates to a method of determining a spatial parameter for PDCCH reception based on a spatial parameter for PDSCH reception.

For example, a spatial parameter corresponding to a spatial parameter for PDSCH reception (e.g., a PDSCH reception beam) indicated by a DCI (e.g., a TCI status field in DCI) received by the terminal through a PDCCH (e.g., a PDSCH reception beam) (e.g., a corresponding beam) may be determined/updated/reconfigured as a spatial parameter (e.g., a PDCCH reception beam) for PDCCH reception.

For example, a QCL reference RS corresponding to the TCI state of the PDSCH may be automatically (e.g., separate signaling without) configured/indicated/applied a PDCCH reception beam for receiving a PDSCH scheduling (that is, a DCI scheduling a PDSCH is transmitted).

In this way, when the PDCCH reception beam is aligned and used based on the DL TCI state of the PDSCH, a beam direction for control channel (e.g., PDCCH) reception may be automatically changed as a robust reception beam direction in which data transmission is performed. Since the PDCCH reception beam is initially configured through RRC signaling, when the channel state is changed due to the movement of the terminal or a change in the surrounding conditions, the robustness of the PDCCH reception beam may be reduced. Basically, a separate procedure or signaling (e.g., RRC reconfiguration procedure or MAC CE message signaling is required for PDCCH reception beam change/update/reconfiguration (i.e., semi-static scheme or higher layer signaling-based scheme) for CORESET configuration update).

As in the present embodiment, when a spatial parameter for PDCCH reception is configured according to a spatial parameter for PDSCH reception, there is an effect that a separate procedure or signaling for changing a spatial parameter for PDCCH reception can be omitted.

In addition, since the spatial parameter for the PDSCH reception is indicated through DCI, according to the present disclosure, it is possible to dynamically indicate/determine the spatial parameter for the PDCCH reception. That is, a spatial parameter for PDSCH reception may be dynamically indicated through a first DCI (or a first PDCCH) scheduling a PDSCH, and accordingly, a spatial parameter for a second DCI (or a second PDCCH) reception may be dynamically determined/updated/reconfigured. (i.e., a dynamic scheme or a lower-layer signaling-based scheme).

The spatial parameter configuration for PDCCH reception in this dynamic scheme (or lower-layer signaling-based scheme) may also be expressed as configuring a linkage between a spatial parameter for PDCCH reception and a spatial parameter for PDSCH reception.

Embodiment 1-1

This embodiment relates to signaling for a spatial parameter configuring method for PDCCH/DCI reception.

For example, in relation to spatial parameter configuration for PDCCH/DCI reception, in order to prevent collision between the existing semi-static scheme (or higher layer signaling-based scheme) and the dynamic scheme (or lower layer signaling-based scheme) according to the present disclosure, information indicating which scheme is applied among the dynamic scheme and the semi-static scheme may be defined. The indication information on the spatial parameter configuration scheme for such PDCCH/DCI reception may be defined as a new parameter for explicit indication.

For example, the new parameter may be named 'PDCCH_beam_enabler'. First, it is possible to configure whether 'PDCCH_beam_enabler' is applied or not in the higher layer (e.g., RRC) setting. When 'PDCCH_beam_enabler' is configured to OFF, spatial parameter configuration for PDCCH/DCI reception may follow a semi-static scheme (or a higher layer signaling-based scheme). When 'PDCCH_beam_enabler' is set to ON, according to an additional parameter for whether a linkage between the PDSCH reception beam and the PDCCH reception beam is activated, the above-described semi-static scheme (or higher layer signaling-based scheme) or a dynamic scheme (or a lower-layer signaling-based scheme) may be applied. The additional activation parameter may be named 'PDCCH_beam_linkage'. The 'PDCCH_beam_linkage' parameter may be included in DCI.

For example, when the higher layer parameter 'PDCCH_beam_enabler' is configured to ON, according to the dynamic scheme (or lower layer signaling-based scheme) in case of that 'PDCCH_beam_linkage' in the DCI field is configured to the first value, or according to the semi-static scheme (or higher layer signaling-based scheme) in case of that 'PDCCH_beam_linkage' in the DCI field is configured to the second value, spatial parameter setting operation for PDCCH/DCI reception may be applied.

The scope of the present disclosure is not limited by the name of a parameter such as 'PDCCH_beam_enabler' or 'PDCCH_beam_linkage' described above, and a parameter with any name indicating whether to apply a dynamic scheme (or lower layer signaling-based scheme) for spatial parameter configuration for PDCCH/DCI reception may be applied.

Embodiment 1-2

This embodiment relates to a target to which spatial parameter configuration for PDCCH reception of a dynamic scheme (or a lower-layer signaling-based scheme) is applied.

As a first method, a spatial parameter for the CORESET in which a PDCCH/DCI for scheduling a PDSCH (i.e., the first PDCCH/DCI) is received/monitored/detected may be determined/updated/reconfigured according to a spatial parameter for the PDSCH reception (e.g., a spatial parameter indicated by the first PDCCH/DCI).

In this case, the above-described semi-static scheme (or higher layer signaling-based scheme) may be applied to the remaining CORESETs except for the CORESET in which the first PDCCH/DCI is monitored.

As an additional example related to the first method, for a search space (SS) in which a PDCCH/DCI (i.e., the first PDCCH/DCI) for scheduling a PDSCH is monitored/detected, a PDCCH spatial parameter having a linkage relationship with the PDSCH spatial parameter may be applied to PDCCH/DCI (sequentially) monitored/detected in the corresponding SS (i.e., the second PDCCH/DCI). In addition, since one CORESET corresponds to a time-frequency resource in which the terminal attempts to decode a control channel candidate using one or more SSs, for the remaining SSs other than the SS in which the first PDCCH/DCI is monitored/detected in one and the same CORESET, a spatial parameter as before (e.g., configured by a semi-static scheme or a higher-layer signaling-based scheme) may be applied.

As a second method, a spatial parameter for a specific CORESET set configured for a terminal may be determined/updated/reconfigured according to a spatial parameter for the PDSCH reception (e.g., a spatial parameter indicated by the first PDCCH/DCI).

Here, the specific CORESET set may correspond to the entire CORESET set for the terminal, regardless of the spatial parameter for the CORESET in which the PDCCH/DCI (i.e., the first PDCCH/DCI) for scheduling the PDSCH is transmitted/monitored/detected.

In addition, the specific CORESET set may correspond to the remaining CORESET(s) except for the specific CORESET among entire CORESET configured for the terminal. Here, the specific CORESET may be CORESET 0, which is a special CORESET configured by the MIB before the RRC configuration. For example, for CORESET 0, neither the above-mentioned semi-static scheme (or higher layer signaling-based scheme) nor the above-mentioned dynamic scheme (or lower layer signaling-based scheme) may be applied.

As an additional example related to the first method or the second method, if a common search space (CSS) for transmitting broadcast data and a UE-specific search (USS) for transmitting unicast data are configured separately to a terminal that can be configured only one CORESET, a spatial parameter configured for USS (or CORESET corresponding to USS) may be dynamically configured/updated, and spatial parameter dynamic change may not be applied to CSS. That is, for one or more specific SSs in one CORESET, the PDCCH reception beam may be dynamically determined/updated/reconfigured using a beam corresponding to the PDSCH reception beam (that is, a dynamic scheme or a lower-layer signaling-based scheme), if present, for the remaining one or more SSs, a PDCCH reception beam may be configured/indicated through RRC/MAC CE (i.e., a semi-static scheme or a higher layer signaling-based scheme).

For example, in the first method, for at least one specific SS (part or all) of entire SS associated with the CORESET in which the first PDCCH/DCI is monitored, a spatial parameter for PDCCH reception may be configured according to the above-described dynamic scheme (or lower-layer signaling-based scheme). Or, in the second method, for at least one specific SS (part or all) of entire SS associated with each CORESET belonging to a specific CORESET set configured for the terminal, a spatial parameter for PDCCH reception may be configured according to the above-described dynamic scheme (or lower layer signaling-based scheme).

In the case of multi-TRP (M-TRP) operation, a CORESET pool or group may be configured. When a plurality of CORESET pools/groups exist, the same CORESET identifier may exist in different CORESET pools/groups. In this case, the first method or the second method may be applied within the CORESET pool/group to which the CORESET in which the first PDCCH/DCI is monitored/received for belongs.

For example, in the case of the first method, for a specific CORESET ID in a specific CORESET pool index/group ID in which the first PDCCH/DCI is monitored, based on the spatial parameter for PDSCH reception, a spatial parameter for PDCCH/DCI reception may be determined. That is, even if the CORESET IDs are the same, the spatial parameter for PDCCH/DCI reception may not be updated for CORESETs belonging to different CORESET pools/groups.

For example, in the case of the second method, for at least one specific CORESET belonging to the CORESET pool index/group ID in which the first PDCCH/DCI is monitored, based on the spatial parameters for PDSCH reception, a spatial parameter for PDCCH/DCI reception may be determined.

Here, the TRP may be applied by being replaced with an expression of a panel, a cell, a transmission point (TP), a base station (gNB, etc.). In addition, the TRP may be classified according to identification information (e.g., index or ID) for the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, when a plurality of CORESET groups are configured for one terminal, the corresponding terminal may be configured or defined to receive data using a multi-DCI-based M-TRP operation.

As a third method, the base station may configure/indicate the terminal to follow one of the first method or the second method. Accordingly, the terminal may apply a spatial parameter for PDCCH/DCI reception based on a spatial parameter for PDSCH reception to an application target configured/indicated according to one of the first method or the second method.

The third method is an example in which the base station has configurability for the first method or the second method, and the base station may configure/indicate directly to the terminal which method of the first method or the second method to apply.

For example, by defining a configuration parameter (e.g., 'PDCCH_beam_method') for a PDCCH spatial parameter in a higher layer (e.g., RRC) configuration, 'PDCCH_beam_method' may be configured to indicate the first method or the second method. Alternatively, when the above-described 'PDCCH_beam_enabler' parameter is configured to ON, the first method or the second method may be indicated or activated through a new parameter 'PDCCH_beam_method' indicated through DCI.

The scope of the present disclosure is not limited by the name of the parameter such as 'PDCCH_beam_method' described above, and a parameter of any name indicating an application target for spatial parameter configuration for PDCCH/DCI reception may be applied.

Embodiment 1-3

This embodiment is about a time reference (or timing) to which the configuration of a spatial parameter for PDCCH/DCI reception is applied based on spatial parameters for PDSCH reception (i.e., the above-mentioned dynamic scheme or lower-layer signaling-based scheme).

The first time reference may be defined as after a predetermined time unit from the time when information indicating the decoding success of the PDSCH (e.g., HARQ ACK), after the terminal receives and attempts to decode the PDSCH scheduled by the first PDCCH/DCI including a spatial parameter (e.g., TCI field) for PDSCH reception.

The second time reference may be defined as after a predetermined time unit from the time when information indicating the decoding success of the first PDCCH/DCI (e.g., separate ACK or specific uplink resource), after the terminal receives and attempts to decode the first PDCCH/DCI including a spatial parameter (e.g., TCI field) for PDSCH reception.

Here, the predetermined time unit may be configured to a symbol, a symbol group, a slot, a slot group, a sub-slot, a subframe, or an absolute time unit (eg, msec). In addition, the time unit may be predefined as a fixed value (e.g., 0, 1, 2, 3, etc.) or may be preconfigured by the base station to a specific one value among candidates of predefined values.

Accordingly, without additional signaling, a spatial parameter for PDCCH/DCI reception may be configured/updated from a timing determined by a common rule by the base station and the terminal.

According to the first time reference, after the terminal transmits HARQ ACK information for the PDSCH (via PUCCH and/or PUSCH), a spatial parameter for PDCCH/DCI reception may be changed (based on the spatial parameter for the PDSCH reception) after a predetermined time unit.

According to the first time reference, when the reception/decoding of the PDSCH scheduled by the first PDCCH/DCI fails even though the first PDCCH/DCI is successfully received/decoded, there may be a problem that a spatial parameter for PDCCH reception cannot be changed/updated. That is, until the HARQ ACK for the PDSCH is transmitted, the spatial parameter for PDCCH reception cannot be changed/updated based on the spatial parameter for PDSCH reception.

According to the second time reference, regardless of whether reception/decoding for PDSCH is successful or not, a spatial parameter for PDCCH/DCI reception may be changed/updated based on a transmission timing of a separate ACK or UL resource (e.g., SRS, PRACH, etc.) indicating success of reception/decoding for PDCCH/DCI.

A separate ACK or UL resource indicating success of reception/decoding for PDCCH/DCI may be preconfigured by a higher layer. For example, when the above-mentioned 'PDCCH_beam_enabler' parameter is configured to ON, a separate UL resource related thereto may be preconfigured through higher layer (e.g., RRC) signaling. Accordingly, when the PDCCH/DCI is successfully received/decoded, an ACK for the PDCCH/DCI is transmitted through a preconfigured separate UL resource, and a spatial parameter for PDCCH/DCI reception may be changed (based on the spatial parameter for the PDSCH reception) after a predetermined time unit from the time the ACK is transmitted.

In this case, separate signaling is required to indicate whether PDCCH/DCI reception/decoding is successful, but compared to the first time reference based on the PUCCH/PUSCH transmission time carrying the HARQ ACK for the PDSCH, according to the second time reference, there is an advantage in that the time delay of changing/updating spatial parameters for PDCCH/DCI reception can be reduced.

Embodiment 2

This embodiment relates to a method of determining a spatial parameter for PUCCH/PUSCH transmission based on a spatial parameter for PDSCH reception.

The PUCCH/PUSCH may correspond to PUCCH and/or PUSCH carrying HARQ information indicating whether reception/decoding of the PDSCH is successful (e.g., HARQ ACK/NACK).

In addition, the PUCCH/PUSCH may also correspond to PUCCH and/or PUSCH carrying other UCIs (e.g., scheduling request (SR), CSI report, etc.) other than ACK/NACK. Furthermore, the PUCCH/PUSCH may also correspond to PUCCH and/or PUSCH simultaneously carrying at least one of SR, ACK/NACK, or CSI.

Determining the spatial parameter for PUCCH/PUSCH transmission based on the spatial parameter for PDSCH reception may expressed as that a linkage between the spatial parameter for PUCCH/PUSCH transmission and the spatial parameter for PDSCH reception is configured. Furthermore, according to embodiments of the present disclosure, a linkage between a spatial parameter for PDSCH reception, a spatial parameter for PDCCH/DCI reception, and a spatial parameter for PUCCH/PUSCH transmission may be configured.

Basically, a transmission spatial parameter (or transmission beam) for PUCCH carrying ACK/NACK for PDSCH may be indicated by PDCCH/DCI for scheduling PDSCH (i.e., the first PDCCH/DCI) or PUCCH resource indicator (PRI) field. Contrary to this, in this embodiment, a spatial parameter for PDSCH reception (e.g., a spatial parameter indicated by a TCI field in the first PDCCH/DCI) may be applied to PUCCH/PUSCH transmission.

In this regard, a spatial parameter for PUCCH/PUSCH transmission may be determined/updated/reconfigured based on a spatial parameter for PUSCH reception, by replacing a spatial parameter for PDCCH DCI reception described in the above-described embodiment 1 and detailed embodiments with a spatial parameter for PUCCH/PUSCH transmission. For example, determining the spatial parameter for PDCCH/DCI reception by a semi-static scheme (or higher layer signaling-based scheme) may be replaced with determining the spatial parameter for PUCCH/PUSCH transmission by the PRI field. In addition, determining the spatial parameter for PDCCH/DCI reception by a dynamic scheme (or lower layer signaling-based scheme) may be replaced with determining the spatial parameter for PUCCH/PUSCH transmission by the TCI field.

Accordingly, while reducing latency and overhead related to RRC reconfiguration or MAC CE message reception for uplink beam configuration/update, it is possible to dynamically configure/indicate a spatial parameter for PUCCH/PUSCH transmission.

For example, assuming that the first PDCCH/DCI has DCI format 1_1 and a TCI field exists in DCI, a spatial parameter for PUCCH transmission carrying ACK/NACK information for a PDSCH scheduled by the first PDCCH/DCI may be determined/indicated according to one of an implicit method or an explicit method.

In the case of the implicit method, if the higher layer parameter (e.g., 'PDCCH_beam_enabler') is configured to ON, the spatial parameter for PUCCH transmission may determined/indicated based on TCI (i.e., spatial parameter for PDSCH reception, or a spatial parameter for PDCCH/DCI reception corresponding to a spatial parameter for PDSCH reception), not PRI.

In the case of an explicit method, a higher layer parameter (e.g., 'PDCCH_beam_enabler') is configured to ON, and according to a value of a parameter newly defined in the DCI field (e.g., 1-bit size 'PUCCH-beam-selection'), a spatial parameter for PUCCH transmission may be determined/indicated based on PRI or TCI. For example, a spatial parameter for PUCCH transmission may be determined/indicated based on the PRI when the value of 'PUCCH-beam-selection' is the first value, or based on the TCI (i.e., a spatial parameter for PDSCH reception, or a spatial parameter for reception PDCCH/DCI corresponding to a spatial parameter for PDSCH reception) when the value of 'PUCCH-beam-selection' is the second value.

On the other hand, when the higher layer parameter (e.g., 'PDCCH_beam_enabler') is configured to OFF, a spatial parameter for PUCCH transmission may be determined/indicated based on the value of the PRI field in DCI.

Even for PUSCH including HARQ ACK/NACK information for PDSCH in a piggyback manner, a spatial parameter for the corresponding PUSCH transmission may be determined/indicated based on TCI in the first PDCCH/DCI scheduling the PDSCH (i.e., spatial parameters for PDSCH reception, or a spatial parameter for PDCCH/DCI reception corresponding to a spatial parameter for PDSCH reception).

As an additional example, when the terminal transmits a PUSCH through a preconfigured resource without a UL grant (or UL scheduling information) (e.g., in the case of a configured grant (CG) method PUSCH transmission), a spatial parameter for the corresponding PUSCH transmission may be determined/indicated based on TCI (i.e., a spatial parameter for PDSCH reception, or a spatial parameter for PDCCH/DCI reception corresponding to a spatial parameter for PDSCH reception) included in the most recently (or last) received PDSCH scheduling DCI prior to the corresponding PUSCH transmission.

Furthermore, even when a PUSCH with or without HARQ ACK/NACK is transmitted in the CG transmission resource(s) at the timing after PUSCH transmission in which the HARQ ACK/NACK for the PDSCH is transmitted in a piggyback manner, a spatial parameter applied to a PUSCH to which recently (or last) transmitted HARQ ACK/NACK is piggybacked may be applied.

Furthermore, even when a PUSCH with or without HARQ ACK/NACK is transmitted in the CG transmission resource(s) at the timing after PUSCH transmission in which the HARQ ACK/NACK for the PDSCH is transmitted in a piggyback manner, a spatial parameter for the corresponding PUSCH transmission may be determined/indicated based on TCI (i.e., a spatial parameter for PDSCH reception, or a spatial parameter for PDCCH/DCI reception corresponding to a spatial parameter for PDSCH reception) included in the most recently (or last) received PDSCH scheduling DCI prior to each CG transmission resource(s).

In the above-mentioned embodiments 1 and 2 and detailed examples thereof, the spatial parameter for PDSCH reception may include QCL reference RS information for QCL type D configured/indicated for the corresponding PDSCH.

For example, when the above-described tci-PresentInDCI parameter is configured to OFF, the spatial parameter for PDSCH reception may be determined according to a spatial parameter (or TCI) configured for CORESET in which the PDCCH/DCI scheduling the corresponding PDSCH (i.e., the first PDCCH/DCI) is monitored/detected.

For example, when the above-described tci-PresentInDCI parameter is configured to ON, the spatial parameter for PDSCH reception may be determined differently depending on whether a scheduling offset (i.e., a time gap between a reception time of a PDCCH/DCI scheduling the corresponding PDSCH and reception of the corresponding PDSCH) is within a predetermined threshold (e.g., timeDurationForQCL) or not. Specifically, when the scheduling offset is within the predetermined threshold, the spatial parameter for PDSCH reception may be determined according to a default TCI state. When the scheduling offset is after the predetermined threshold, the spatial parameter for PDSCH reception may be determined according to the TCI field in DCI indicated by the PDCCH/DCI (i.e., the first PDCCH/DCI) scheduling the corresponding PDSCH.

Here, the default TCI state may correspond to a TCI state associated with the CORESET or SS set having the lowest identifier in the latest slot monitored by the terminal. Specifically, the default TCI state corresponds to QCL information applied when the terminal performs buffering before completing DCI decoding, and a TCI state applied to 'the CORESET associated a monitored search space with the lowest CORESET-ID in the latest slot in which one or more CORESETs within the active BWP of the serving cell'.

In the above-described embodiments 1 and 2 and detailed examples thereof, a TCI field in DCI may indicate a plurality of TCI states (i.e., a plurality of spatial parameters). In this case, one specific TCI state among the plurality of TCI states may correspond to a spatial parameter indicated by the first PDCCH/DCI in the above-described examples. For example, one specific TCI state may correspond to the TCI state having the lowest or highest identifier, or may correspond to the first indicated or the last indicated TCI state ID.

Figure 16:
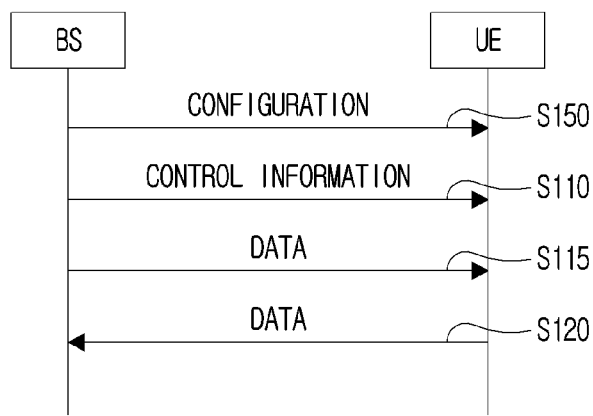
FIG. 16 is a diagram for explaining a signaling process according to an embodiment of the present disclosure.

FIG. 16 is a diagram for explaining a signaling process according to an embodiment of the present disclosure.

An example of the signaling operation of the base station and the terminal for the above-described embodiments may be as shown in FIG. 16. Here, the terminal/base station is just an example, and it may be substituted for various devices as described in FIG. 17. The base station may correspond to one base station including a plurality of TRPs or one cell including a plurality of TRPs. FIG. 16 is for convenience of description, and does not limit the scope of the present disclosure. Also, some of the steps described in FIG. 16 may be merged or omitted. In addition, in performing the procedures described below, the above-described downlink transmission/reception operation or uplink transmission/reception operation or beam management operation may be applied, but the scope of the present disclosure is not limited thereto, and various downlink reception or uplink transmission operations can be applied.

The UE may receive configuration information (Configuration) from the base station (S105). The Configuration may include system information (SI), scheduling information, beam management (BM) related settings (e.g., DL BM related CSI-ResourceConfig IE, NZP CSI-RS resource set IE, etc.), the configuration of the base station (e.g., TRP configuration) information and the like. For example, the Configuration includes information related to reconfiguration/update of RS information for spatial-related (e.g., QCL-related) assumption (e.g., information related to whether reconfiguration/update is performed, performing method, timing, etc.). The configuration may be transmitted through higher layer (e.g., RRC or MAC CE) signaling. In addition, when the configuration is predefined or preconfigured, the corresponding step may be omitted.

For example, based on the above-described embodiments, the Configuration may include information about at least one of TCI state(s), QCL RS(s), or DMRS port(s). For example, one or more TCI states may be configured for DMRS port(s) related to a control channel (e.g., PDCCH) based on the configuration. For example, the TCI state may include RS information for spatial-related (e.g., QCL-related) assumption. For example, based on the configuration, a plurality of TCI states may be configured in a specific CORESET and/or activation/deactivation of a TCI state to be added may be configured. For example, the TCI state may be included with configuration information related to CORESET. For example, the QCL relation RS indicated by the TCI state related to the control channel (e.g., PDCCH) may be reconfigured/update based on the QCL relation RS indicated by the TCI related to the data channel (e.g., PDSCH) included in the control information received in step S110 to be described later.

For example, the operation of receiving the Configuration, by the UE (100/200 in FIG. 17), from the base station (200/100 in FIG. 17) in the above-described step S105 may be implemented by the apparatus of FIG. 17 to be described below. For example, referring to FIG. 17, one or more processors 102 may control one or more transceivers 106 and/or one or more memories 104, etc. to receive the Configuration, and one or more transceivers 106 may receive the configuration from the base station.

The UE may receive control information from the base station (S110). The control information may be received through a control channel (e.g., PDCCH). For example, the control information may be DCI. For example, based on the above-described embodiments, the control information may include information on at least one of TCI state(s), QCL RS(s), or DMRS port(s). For example, one or more TCI states may be indicated for DMRS port(s) related to a data channel (e.g., PDSCH) by a TCI state field in the control information (e.g., DCI). For example, the TCI state may include RS information for spatial-related (e.g., QCL-related) assumption.

For example, the UE may receive the control information based on information configured/indicated in step S105 (e.g., TCI state configuration for PDCCH). For example, based on the above-described embodiments, the QCL-related RS indicated by the TCI state related to the control channel (e.g., PDCCH) may be reconfigured/update based on the QCL-related RS indicated by the related TCI state associated with a data channel (e.g., PDSCH) included in the control information. For example, the QCL-related RS may be reconfigured/updated in all CORESET(s) configured to the UE, or the reconfiguration/updated may be performed in CORESET in which the control information (e.g., DCI) is transmitted. As an example, the reconfiguration/update may be performed after a certain time unit (e.g., slot/subframe/sub-slot/symbol) based on the time when the HARQ-ACK information for the control information/data reception success is transmitted.

For example, the operation of receiving the control information, by the UE (100/200 in FIG. 17), from the base station (200/100 in FIG. 17) in the above-described step S110 may be implemented by the apparatus of FIG. 17 to be described below. For example, referring to FIG. 17, one or more processors 102 may control one or more transceivers 106 and/or one or more memories 104, etc. to receive the control information, and one or more transceivers 106 may receive the control information from the base station.

The UE may receive data from the base station (S115). The data may be received through a data channel (e.g., PDSCH). For example, the data may be scheduled based on the control information. In addition, the data may be received based on the information configured/indicated in steps S105/S110. For example, based on the information configured/indicated in steps S105/S110, the UE may perform channel estimation/compensation and may receive the data. For example, based on the above-described embodiments, the UE may perform channel estimation/compensation based on the QCL RS corresponding to the TCI state for the PDSCH.

For example, the operation of receiving the data, by the UE (100/200 in FIG. 17), from the base station (200/100 in FIG. 17) in the above-described step S115 may be implemented by the apparatus of FIG. 17 to be described below. For example, referring to FIG. 17, one or more processors 102 may control one or more transceivers 106 and/or one or more memories 104, etc. to receive the data, and one or more transceivers 106 may receive the data from the base station.

The UE may transmit data to the base station (S120). The data may be transmitted through a UL channel (e.g., PUCCH/PUSCH). For example, the UL Data may include HARQ-ACK information (e.g., ACK/NACK) for PDSCH, CSI report, and the like. For example, as in the above-described embodiments, a transmission beam (or QCL-related RS) of a UL channel may be configured/updated/reconfigured. In addition, the UL data may be transmitted based on the configured transmission beam (or QCL-related RS).

For example, the operation of transmitting the UL data, by the UE (100/200 in FIG. 17), to the base station (200/100 in FIG. 17) in the above-described step S120 may be implemented by the apparatus of FIG. 17 to be described below. For example, referring to FIG. 17, one or more processors 102 may control one or more transceivers 106 and/or one or more memories 104, etc. to transmit the UL data, and one or more transceivers 106 may transmit the UL data from the base station.

As mentioned above, the above-described base station/UE signaling and operation (e.g., embodiment 1, embodiment 2, FIGS. 15, 16, etc.) can be implemented by the apparatus of FIG. 17 to be described below. For example, the base station may correspond to the first wireless device, the UE may correspond to the second wireless device, and vice versa may be considered in some cases.

Figure 17:
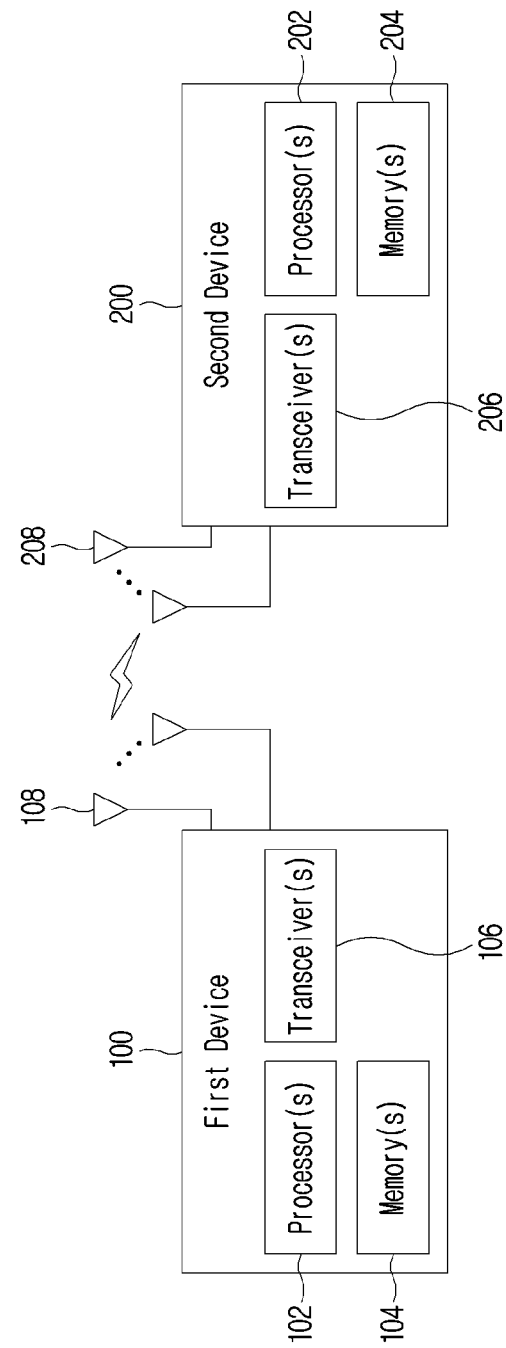
FIG. 17 is a diagram which illustrates a block diagram of a wireless communication device according to an embodiment of the present disclosure.

For example, the base station/UE signaling and operation (e.g., embodiment 1, embodiment 2, FIGS. 15, 16, etc.) described above may be processed by one or more processors (e.g., 102, 202) of FIG. 17, and the above-described base station/UE signaling and operation (e.g., embodiment 1, embodiment 2, FIG. 15, FIG. 16, etc.) may be stored in a memory (e.g., one or more memories 104 and 204 of FIG. 17) in the form of an instruction/program (e.g., instruction, executable code) for driving at least one processor of FIG. 17 (e.g., 102 and 202).

General Device to which the Present Disclosure May be Applied

FIG. 17 illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving a first downlink control channel for control information scheduling a downlink data channel;
receiving the downlink data channel based on a spatial parameter included in the control information; and
receiving a second downlink control channel based on a control resource,
wherein, based on the reception of the downlink data channel and information for enabling an update of a spatial parameter related to the control resource, the spatial parameter related to the control resource is updated based on the spatial parameter for the downlink data channel, which is included in the control information.

2. The method of claim 1,
wherein the entire control resource includes at least one control resource configured for the user equipment other than a control resource related to an initial access.

3. The method of claim 1,
wherein, based on the information for disabling an update of the spatial parameter related to the control resource, a reception of the second downlink control channel is based on a pre-configured spatial parameter.

4. The method of claim 1,
wherein the spatial parameter related to the control resource is used after a pre-determined time duration based on a transmission timing of information for a successful decoding of the control information or the downlink data channel.

5. The method of claim 1, further comprising:
transmitting uplink information based on the spatial parameter for the downlink data channel, which is included in the control information,
wherein the uplink information includes acknowledgement/non-acknowledgement information for the downlink data channel or channel state information.

6. The method of claim 1,
wherein, based on a plurality of spatial parameters being included in the control information, the spatial parameter related to the control resource is updated based on a spatial parameter related to a lowest or highest index among the plurality of spatial parameters.

7. A user equipment (UE) comprising:
at least one transceiver; and
at least one processor coupled with the at least one transceiver,
wherein the at least one processor is configured to:
receive a first downlink control channel for control information scheduling a downlink data channel;
receive the downlink data channel based on a spatial parameter included in the control information; and
receiving a second downlink control channel based on a control resource,
wherein, based on the reception of the downlink data channel and information for enabling an update of a spatial parameter related to the control resource, the spatial parameter related to the control resource is updated based on the spatial parameter for the downlink data channel, which is included in the control information.

8. A method comprising:
transmitting a first downlink control channel for control information scheduling a downlink data channel;
transmitting the downlink data channel based on a spatial parameter included in the control information; and
transmitting a second downlink control channel based on a control resource,
wherein, based on a reception of the downlink data channel and information for enabling an update of a spatial parameter related to the control resource, the spatial parameter related to the control resource is updated based on the spatial parameter for the downlink data channel, which is included in the control information.

9. A non-transitory computer readable medium storing at least one computer program comprising instructions that, when executed by at least one processor, cause the at least one processor to perform the method of claim 1.

10. The method of claim 1,
wherein a spatial parameter for entire control resource for a user equipment including the control resource is updated based on the spatial parameter for the downlink data channel, which is included in the control information.

11. The method of claim 1,
wherein, based on a reception of the downlink data channel, a spatial parameter for a control resource group including a control resource for the first downlink control channel is updated based on the spatial parameter for the downlink data channel, which is included in the control information.

* * * * *